United States Patent Office 3,012,942
Patented Dec. 12, 1961

3,012,942
VITAMIN C CONCENTRATE
Philip Morse, La Habra, Calif., assignor to Nutrilite Products, Inc., Buena Park, Calif., a corporation of California
No Drawing. Original application Nov. 18, 1958, Ser. No. 774,598. Divided and this application Jan. 21, 1960, Ser. No. 3,710
2 Claims. (Cl. 167—81)

This invention relates to vitamin C or ascorbic acid and, more particularly, to a method for the concentrating of vitamin C from acerola cherries and to the novel vitamin C concentrates thereby produced.

This application is a division of my co-pending application Serial No. 774,598, filed November 18, 1958.

It has been recognized that certain plant juices contain vitamin C. For example, the juices of lemons, cabbages, tomatoes and potatoes have been used for the therapeutic administration of vitamin C and also to bolster the daily supply thereof for generally healthy individuals. The flavor of juices rich in vitamin C may be distasteful or irritating to most persons. Moreover, the quantity of vitamin C present in natural and concentrated juices may be so small that large doses must be administered.

The extraction of vitamin C from natural products has hitherto been considered commercially infeasible because of the economical synthetic methods available for the production thereof. Most processes for the isolation of ascorbic acid or the preparation of ascorbic acid concentrates from natural sources depend on the formation of a derivative and reconversion to the free acid. Frequently, such processes take advantage of the acid characteristic of vitamin C to form unstable metallic salt solutions which are difficult to purify. Moreover, reconversion to the free ascorbic acid entails hydrolysis with acids which tend to cause the decomposition of vitamin C. Inherent in such methods of isolation is the problem that aqueous solutions of ascorbic acid appear to be unstable and turn an undesirable dark color. Indeed, considerable work has been devoted solely to the development of additives to stabilize ascorbic acid solutions. Additionally, natural vitamin C concentrates tend to be hygroscopic and hence absorb water which impairs the stability thereof.

It is apparent a process for the preparation of vitamin C concentrates from natural products, to be commercially feasible, should be inexpensive and provide an enriched, stable concentrate characterized by good color.

It is, accordingly, a primary object of this invention to provide a process for producing a vitamin C concentrate of enhanced stability.

It is a further object of this invention to produce a vitamin C concentrate characterized by excellent color, and by a significantly higher vitamin C content than analogous concentrates of the prior art.

It is an additional object of this invention to produce in the form of a powder a vitamin C concentrate substantially less hygroscopic than analogous concentrates of the prior art.

It is a still further object of this invention to provide from acerola cherries, a concentrate containing vitamin C in proportions requisite to direct administration in small doses to the human body.

It is another object of this invention to provide a method for the production from acerola cherries of vitamin C reduced in ascorbic acid oxidase content.

It is a more specific object of this invention to provide a method of producing from acerola cherries a concentrate in the form of a powder and in which the vitamin C content is at least about two to threefold that present in the natural fruit juice powder.

It is a still further specific object of this invention to provide a novel process, including a fermentation step, for the production of a vitamin C concentrate from acerola cherries.

It is a particular object of this invention to reduce by fermentation the natural sugar content of acerola cherry juice.

It is a more particular object of this invention to remove, by solvent precipitation, undesirable solids from vitamin C concentrates derived from acerola cherries.

It is a still more particular object of this invention to remove by solvent precipitation in acetone or methyl alcohol or mixtures thereof, undesirable solids from vitamin C concentrates derived from acerola cherries.

The invention, in its generic scope, entails the preparation of a vitamin C concentrate from the juice of acerola cherries by a process which includes the step of subjecting said juice to fermentation, preferably with an inoculum in the form of a yeast culture to materially decrease the concentration of sugars therein and increase the percent of ascorbic acid in the total solids present. In a specific alternate embodiment of this invention, the juice is first fermented to destroy undesirable sugars, and additional solids are thereafter removed by selective precipitation in methyl alcohol, acetone, or a mixture thereof. The invention is appropriately practiced under conditions which prevent the ordinary and characteristic oxidase or enzymatic deterioration of vitamin C normally incident the isolation thereof from fruits or berries.

The vitamin C concentrate produced according to the process of this invention demonstrates, in dry form, no noticeable reduction in ascorbic acid content when stored at room temperature for periods as long as one year. Conventionally prepared acerola juice syrup concentrates exhibit ascorbic acid losses of 30% to 40% after storage for two weeks at room temperature. Generally the vitamin C concentrate is stored in the dry or powdered form in a desiccant atmosphere to preclude moisture absorption.

The fermentation procedure characteristic of the invention is appropriately interrelated with additional procedural steps requisite to provide an integrated process for the production of vitamin C concentrates from acerola cherries. One such specific, detailed embodiment of the invention includes the following steps, each of which is described in some detail hereinafter. Such description is offered to inform those skilled in the art of the best mode presently known to process the invention and not in limitation of the generic scope thereof.

A. Preliminary acerola cherry processing;
B. Separating ascorbic acid containing juice from the processed acerola cherries;
C. Pasteurization of the juice;
D. Fermentation of the juice to reduce the sugar content;
E. Filtration or clarification of the fermented juice;
F. Concentration of the fermented juice;
G. Solvent precipitation of insoluble solids; and
H. Drying to produce a vitamin C concentrate in dry or solid form.

A. PRELIMINARY ACEROLA CHERRY PROCESSING

The average vitamin C content of acerola cherries will approximate the following values in milligrams of vitamin C content per 100 grams of cherries: ripe, 1400; yellow, 2000; and green, 2800. It is preferable, in the production of vitamin C concentrates from acerola cherries, to utilize green or yellow fruit which contains substantially more vitamin C than red or ripe fruit.

After the fruit has been harvested, care should be taken to protect the cherries from damage due to overheating, direct rays of the sun and mashing. Processing of the cherry should be carried out in a minimum time after harvesting due to rapid deterioration of the ascorbic acid content after the cherry has been picked. The acerola cherries have a thin, tender skin which is easily broken. Damaged cherries deteriorate even more quickly and must be processed immediately or held in cold storage until processing can be arranged. It is therefore, desirable to use fresh fruit and promptly press the juice therefrom.

Because of the fragile texture of the acerola cherry skin, the selected washing procedure is preferably gentle, and a minimum of washing time is appropriately utilized to preclude leaching of the ascorbic acid from the cherries. Generally, the cherries may be washed by a quick dipping, followed by a mild, fresh water spray. However, the washing should be adequate to free the fruit from all foreign matter to insure the production of a high quality, pure concentrate.

B. SEPARATING ASCORBIC ACID-CONTAINING JUICE FROM THE PROCESSED ACEROLA CHERRIES

The juice containing the ascorbic acid is appropriately expressed from the whole fruit either by pulping or pressing, although any desired method can be utilized. Pressing is preferred to pulping which tends to result in enzymatic deterioration of the ascorbic acid (ascorbic acid oxidase). The exact nature of ascorbic acid oxidase is not known; however, it is presumed to occur when the pulp and juice are commingled in the presence of oxygen. The skin of the cherry is thought to contain an enzyme which reacts with the ascorbic acid in the juice when it is liberated from the skin in the presence of oxygen. The oxidase reaction, therefore, does not take place in the whole fruit due to the lack of intimate contact of the enzyme and ascorbic acid and absence of oxygen. During pulping the juice and enzyme are commingled in the presence of oxygen which is largely obviated when the juice is expressed from the fruit by pressing. If pulping is used, special precautions are appropriately observed to exclude oxygen, or alternately, anti-oxidants which are generically contemplated, can be added. The preferred anti-oxidants are hydrosulfites, such as sodium and ammonium hydrosulfites, which react with the natural acids in the fruit to form hydrosulfuric acid which reduces any dehydroascorbic acid present to ascorbic acid and prevents the formation and deterioration of the readily destroyable dehydroascorbic acid.

Several types of fruit presses may be used to express the juice from the fruit. To express the juice from the cherry, the hydraulic and screw type presses used in related fields of processing are adaptable to give a satisfactory performance. In general, a modified hydraulic press is preferred using ten thousand to twenty-five thousand pounds of pressure per square foot of platin surface to give satisfactory separation of the juice from the pulp. The juice is preferably collected in a holding tank and then passed through a centrifuge to remove small pulp particles which may be present. The juice thus is obtained almost pulp-free and requires less time and equipment to process than when the separation is carried out by pulping the fruit. However, it is to be understood that any type of hitherto known method of pressing and pulping may be employed in this novel process incident to the usual and ordinary considerations governing selection, which are well known to those skilled in the art.

The expressed juice is preferably clarified to remove any residual pulp. If the residual pulp is not separated, the juice will turn a dark brown color during pasteurization and impart an undesirable strawlike flavor to the ascorbic acid product. The expressed juice is clarified and processed by any known methods including filtration and centrifugation. For example, either a high speed centrifuge or a solid, basket-type centrifuge using a basket overflow for continuous operation may be utilized. The overflow basket centrifuge operating at approximately 1800 r.p.m., which gives a superior separation while requiring a minimum of process time, is preferred.

C. PASTEURIZATION OF THE JUICE

The clarified juice is stabilized by flash pasteurization, which destroys most bacteria, pectinase and ascorbic acid-destroying enzymes. Many commercial pasteurizers are available which are satisfactory for pasteurizing the juice. Among other acceptable pasteurizers, the following are illustrative: (1) plate and frame pasteurizers; (2) tubular pasteurizers; (3) tubular pasteurizers with rapidly revolving mutator; and (4) pasteurizers with direct steam injection systems. The selection of the particular type pasteurizer will depend upon the pasteurizing conditions desired, such as temperature and holding time, and the convenience to the user. Generally the juice is pasteurized at a temperature of 165 to 205° F. for 30 to 60 seconds. However, the pasteurization may be carried out under different and variant conditions well known to those skilled in the art.

D. FERMENTATION OF THE JUICE TO REDUCE THE SUGAR CONTENT

After pasteurization, the juice is preferably placed directly into a fermenter. The fermenter is most appropriately constructed of black iron clad with stainless steel and equipped with a cooling jacket to cool and maintain the juice at the desired fermentation temperature. As little as one part per million of iron or copper will catalyze the oxidative destruction of the ascorbic acid. Therefore, all pipe and valve fittings which come in contact with juice should also be constructed of stainless steel or other suitable noncatalytic material. A slow-speed agitator is generally employed to facilitate the cooling of the flash-pasteurized juice and to provide dispersion of the inoculum in the juice.

It is desirable that there be no aeration of the inoculum on the juice during the fermentation and the fermenter should be equipped with all the necessary nozzles and steam seals for the addition of the inoculum and the juice and the withdrawal of sterile samples without the entry of harmful bacteria. Details of the procedure for introducing the inoculum into the juice and design of the equipment are well known to the art.

The process of the invention embraces generically the reduction by fermentation of the sugar content and particularly the reducing sugar content of the acerola juice. All of the various expedients effective to achieve such fermentation are therefore contemplated. The art is well cognizant of various procedures, techniques, microorganisms, enzymes, and the like appropriate for utilization in the fermentation step of the invention which accordingly are not here described in detail.

Preferable reduction in sugar content of acerola juice processed pursuant to the invention is achieved by fermentation with yeasts, which, together with other fermentation-inducing materials fall within the generic scope of the invention. *Saccharomyces carlsbergensis*, *S. cerevisiae* and *S. fragilis* are satisfactory and are effective to reduce the sugar content in the juice to less than 1.0%.

When a yeast is used to achieve fermentation, it is important that the inoculum, when added to the pasteurized and clarified juice, be in the log phase of growth. The particular incubation period, of course, will be dependent on the particular yeast to be employed and will be well known to those skilled in the art. However, it has been found that generally an incubation period of at least about 20 and preferably from about 24 to about 48 hours is satisfactory.

After incubation, the inoculum is introduced by aseptic techniques into the fermenter filled with flash-pasteurized juice. Mild agitation is generally used for short periods for purposes of obtaining homogeneous mixtures. The flash-pasteurized juice is preferably allowed to ferment for at least about 15 hours and more appropriately for about 20 to about 55 hours with only occasional agitation and no aeration. The temperature is appropriately maintained between approximately 70 to 90° F. with cooling water. In a preferred embodiment of the invention, the juices are allowed to ferment with a yeast for about 24 to 48 hours at a temperature of 81° F.

Samples of the fermented mixture may be withdrawn periodically for chemical analysis to determine the progress of the fermentation reaction. When the sugar content of the mixture has been reduced to the desired level, the fermentation reaction may be discontinued. Known tests may be applied for analysis of the sugar composition of the mixture and are readily ascertainable from the prior art.

E. FILTRATION OR CLARIFICATION OF THE FERMENTED JUICE

After the fermentation reaction has proceeded to the desired degree, the fermented juice may be clarified by the methods as hereinbefore set forth. Generally a solid basket-type centrifuge with centrifuge speed of 1600 to 2000 r.p.m. and more preferably 1800 r.p.m. has been found to be satisfactory for the separation, and the flow may be adjusted to allow sufficient holding time to obtain a clear filtrate. The centrifuged juice is collected in a stainless steel tank while the yeast may be recovered from the centrifuge and dried for further use in other products.

F. CONCENTRATION OF THE FERMENTED JUICE

The clarified, fermented juice is concentrated in an evaporator. Any of a number of known and conventional evaporators may be employed; however, a single-stage, low temperature falling film flash evaporator is preferred over other conventional types of equipment, since there will be no off-flavor imparted to the juice and no loss of ascorbic acid during its operation. The concentrating temperature is at least about 35° F. and may range from about 40° F. to about 100° F.; however, a temperature within the range of about 55° F. to about 70° F. is preferred. The evaporation of the juice is continued until the soluble solids of the juice are increased in concentration from an initial value of approximately 6% by weight when introduced into the evaporator to at least about 65% and preferably a range of about 30% to about 80% by weight.

G. SOLVENT PRECIPITATION OF SOLIDS

The fermented juice, after concentration, contains undesirable solids which may be removed by a fractional precipitation in either one of methyl alcohol, acetone or a mixed solvent composition of methyl alcohol and acetone. Generally the concentrated juice containing 30% to 80% by weight of soluble solids may be fractionated in such a solvent system; however, it is preferred to use a juice concentrate containing approximately 40% soluble solids for further purification. The amount of solvent utilized may vary; however, it has been found satisfactory to employ an amount of solvent equal to at least about 5 and preferably from about 8 to about 15 times the weight of the concentrate.

Utilization of solvent in an amount equal to about ten times the weight of the juice concentrate is particularly appropriate. For example, when methyl alcohol is employed as a solvent, a quantity of alcohol ten times the weight of the concentrate is preferably introduced into the collecting tank containing the juice concentrate. The concentrate and the alcohol are stirred until all the concentrate is dissolved in the solvent. During the addition of the alcohol to the concentrate a flocculent precipitate forms, which may be separated from the solvent by filtration and washed with a small quantity of fresh methyl alcohol. The precipitate may be vacuum dried and may be used as an ingredient of animal food compositions.

The filtrate alcoholic solution may then be added to a quantity of acetone which is ten times the weight of the initial juice concentrate, and the resulting mixture is stirred during the addition to yield an additional precipitate which may be separated and washed with a small quantity of fresh acetone. This precipitate may also be vacuum dried and is useful as an animal feed ingredient.

Alternatively, the concentrate may be introduced initially into the mixed solvent system containing methyl alcohol and acetone; however, it has been found that unwanted solids separate in greater quantity when the solvent precipitation is carried out successively.

The solvent filtrate is vacuum concentrated in an evaporator to 40 to 80% by weight of soluble solids. Preferably a low temperature falling film evaporator, as described above, is employed in this concentration step of the process. The methyl alcohol and acetone distillate may be recovered by known procedures, and recycled to the system.

H. DRYING TO PRODUCE A VITAMIN C CONCENTRATE IN DRY OR SOLID FORM

The vacuum concentrated juice containing about 40 to about 80% by weight soluble solids is dried to provide a stabilized, enriched ascorbic acid containing powder. In some cases, however, it may be desirable directly to use the vacuum concentrated juice. The methods of drying normally used in the art may be employed; however, it is preferred to use a vacuum tray drier and puff dry the concentrate. In such a procedure, it is preferred to use a concentrate containing at least about 50 and more appropriately from about 60 to about 80% by weight soluble solids. The concentrate is spread evenly on stainless steel trays and puff dried under a vacuum of at least about 4000 and preferably from about 1000 to 2000 microns vacuum, at a temperature between at least about 90° F. and preferably from about 100° F. to about 180° F. and for a period of at least about 30 and preferably from about 60 to about 120 minutes in a vacuum tray drier.

After drying, the concentrate may be used directly or ground into a powder and stored for future use. The concentrate may be stored in a sealed container with a desiccant for relatively long periods of time without deterioration or undesirable chemical change.

The following examples are given as illustrative, without limitation, of the best mode for the practice of the invention.

*Example 1*

A 50 pound sample of green acerola cherries was pressed and the juice was transferred into a Sharples super centrifuge to separate the residual pulp from the juice.

The juice was then collected from the centrifuge and put into a pasteurizer at a temperature of 190° F. for 45 seconds. The juice was withdrawn from the pasteurizer and placed in a fermenter constructed of black iron and clad with stainless steel. A sample of *Saccharomyces carlsbergensis* (inoculum), incubated for a period of 24 hours so that the inoculum was in the log phase of growth, was introduced into the fermenter filled with the flash-pasteurized juice and allowed to ferment for a period of 40 hours at a temperature of 86° F. Slight agitation was used to obtain a homogeneous mixture when the inoculum was first introduced into the fermenter and thereafter the mixture was occasionally agitated during the fermentation process. The growth of the inoculum, the handling of the flash pasteurized juice and the agitation of the mixture of flash pasteurized juice and inoculum were all carried out under conditions to minimize aeration of the fluids. Samples were withdrawn periodically for tests to determine the sugar content of the mixture. When the sugar content had been reduced to a level of 0.0014 gms./cc., the fermentation was discontinued.

The fermented juice was clarified by passing it through a solid basket-type centrifuge, using approximately 1800 r.p.m. The clarified fermented juice was then collected in a stainless steel collecting tank. The yeast was recovered from the centrifuge and dried for use as a by-product.

The clarified juice was passed from the collecting tank into a single-stage, low temperature, falling film flash evaporator and the juice concentrated at a temperature of approximately 62° F. The evaporation was continued for a period of 45 minutes during which time the soluble solids were concentrated from a value of approximately 6% to 40% by weight soluble solids.

A volume of methyl alcohol equal to ten times the weight of the 40% concentrate was then added and the mixture stirred to effect dissolution of the concentrate in the solvent. During the stirring a white solid precipitated which was filtered and washed with a small quantity of fresh methyl alcohol. The white precipitate was air dried for use in various feed preparations.

A volume of acetone equal to ten times the weight of the initial 40% juice concentrate was added to the methyl alcohol filtrate and the mixture was stirred. An additional precipitate formed in the methanol-acetone solvent mixture which was filtered and washed with a small quantity of fresh acetone.

The filtrate was then vacuum concentrated to 70% by weight soluble solids in a low temperature falling film evaporator at a temperature of 58° F. The methyl alcohol acetone distillate was recovered and separated for recycle in the system.

The concentrate of 70% soluble solids was spread evenly on a stainless steel tray one-sixteenth of an inch deep. The tray was placed in a vacuum tray drier and the concentrate was puff dried at a vacuum of 500 microns and at a temperature of 140° F. for approximately sixty minutes.

The vacuum cabinet was cooled to room temperature with water, the vacuum was released and the puff dried product removed in a dehumidified room. The puff dried product was ground in a powder mill to a uniform powder, which was stored with a calcium oxide desiccant in order to keep the ascorbic acid concentrate product free from the action of the atmospheric moisture.

The concentrate possessed excellent color and, when placed in a liquid reconstituted immediately. The concentrate was less hygroscopic than analogous products made in the conventional manner and was, therefore, easier to handle during further processing. The ascorbic acid content was raised from a value of 25%, based on the dried fruit, to 57.00% in the puff dried concentrate. Chemical analysis indicated the following chemical composition of the dried ascorbic acid concentrate:

| Constituent: | Assay (wt. percent) |
|---|---|
| Ascorbic acid | 57.00 |
| Dehydroascorbic acid | None detected |
| Reducing sugars | 8.10 |
| Protein | 11.20 |
| Ether solubles | None detected |
| Ash | 15.00 |
| Potassium | 0.50 |
| Calcium | 0.04 |
| Boron | 0.004 |
| Phosphorus | 0.020 |
| Magnesium | 0.008 |
| Zinc | 0.002 |
| Sodium | 0.4 |
| Iron | 0.002 |
| Manganese | 0.0002 |

The pH of a solution of one gram of the concentrate in 100 ml of water was 3.90.

Example 2

The process of Example 1 was repeated except that after the fermentation and clarification process, the juice was evaporated and vacuum dried, with omission of the solvent fractionation step.

The ascorbic acid powder concentrate was comparable to that obtained in Example 1 except that the ascorbic acid content was 7% lower than when the solvent fractionation step was employed and correspondingly the percentage content of other insolubles was increased.

Chemical analysis indicated the following chemical composition of the dried ascorbic acid concentrate:

| Constituent: | Assay (wt. percent) |
|---|---|
| Ascorbic acid | 50.50 |
| Dehydroascorbic acid | 0.300 |
| Reducing sugars | 1.80 |
| Protein | 11.60 |
| Ether solubles | None detected |
| Ash | 18.00 |
| Potassium | 3.80 |
| Calcium | 0.20 |
| Boron | 0.0007 |
| Phosphorus | 0.07 |
| Magnesium | 0.04 |
| Manganese | 0.002 |
| Zinc | 0.002 |

The pH of a solution of one gram of the concentrate in 100 ml. of water was 4.2.

Example 3

Example 2 was repeated except that yellow acerola cherries were employed in the process instead of green acerola cherries.

As pointed out previously, yellow acerola cherries have a lower initial ascorbic acid content than do the green acerola cherries and correspondingly a higher content of reducing sugars. Generally the yellow acerola cherry has an ascorbic acid content of 2000 mg./100 gms. or a percentage content of 20% on the dry basis. When the cherry is fermented according to the process of Example 1, the ascorbic acid content in the final powder obtained was raised to 36% and the product was characterized by excellent color and flavor properties. The product was more stable to atmospheric moisture and was capable of being stored over long periods of time. Analysis of the product showed the following percentage composition.

| Constituent: | Assay (wt. percent) |
|---|---|
| Ascorbic acid | 36.00 |
| Dehydroascorbic acid | None detected |
| Reducing sugars | 8.90 |
| Protein | 7.80 |
| Ether solubles | None detected |
| Ash | 18.00 |
| Potassium | 4.20 |
| Calcium | 0.20 |
| Boron | 0.0007 |
| Phosphorus | 0.03 |
| Magnesium | 0.04 |
| Manganese | 0.004 |
| Zinc | 0.002 |

The pH of a solution of one gram of the concentrate in 100 ml. of water was 4.20.

Example 4

Example 2 was repeated except that ripe acerola cherries were employed in the process instead of green acerola cherries.

The initial concentration of ascorbic acid based on the dried fruit was 10% by weight. After processing of the cherry, the concentration of ascorbic acid in the dried powder was 32% by weight or an increase of more than three times that found in the initial product on a dry basis.

The product was characterized by excellent color properties and could be reconstituted immediately in water.

Analysis of the product showed the following percentage composition.

| Constituent: | Assay (wt. percent) |
|---|---|
| Ascorbic acid | 32.00 |
| Dehydroascorbic acid | 0.70 |
| Reducing sugars | 8.50 |
| Protein | 5.30 |
| Ether solubles | 0.04 |
| Ash | 17.00 |
| Potassium | 3.80 |
| Calcium | 0.20 |
| Boron | 0.0007 |
| Phosphorus | 0.04 |
| Magnesium | 0.03 |
| Manganese | 0.002 |
| Zinc | 0.003 |

The pH of a solution of one gram of the concentrate in 100 ml. of water was 4.20.

The vitamin concentrates prepared in accordance with this invention can be used in various fruit drinks to give refreshing beverages of enhanced ascorbic acid content. The reconstituted concentrate blends well with mango concentrate and also with lime, lemon, grapefruit, pineapple and soursap. It can be used in juices and nectars of fruits that are considered poor sources of vitamin C, such as apple, pear, grape, apricot, cherry and peach. It also blends well with orange juice and can be used to build up the flavor, color and ascorbic acid content of certain types of low solid orange juices.

The concentrate also blends well with rum and gin to make a refreshing drink. In addition, it may be used in syrups, ice cream, frozen juices and preserves. A puree can be made by adding sugar and sufficient citrus pectin to produce the desired consistency. Such purees can be frozen and used to make a punch with limeade or for ice cream topping.

I claim:
1. An ascorbic acid concentrate in the form of a substantially dry solid prepared from acerola cherries, said concentrate having an ascorbic acid content at least ten times that of the acerola juice from which it was derived, said concentrate having a shelf life at room temperature of at least one year and being prepared by separating the juice from fresh acerola cherries, pasteurizing said clarified juice at a temperature range of from about 165 to about 205° F. for a time period of from about 30 to 60 seconds, adding an inoculum to the pasteurized juice causing fermentation to take place at a temperature of from about 70 to about 90° F. for a time period of from about 15 to about 55 hours to materially decrease the concentration of sugars, separating solids from said fermented juice to produce a first clear liquor, evaporating said first clear liquor at a temperature within the range of about 35° F. to about 100° F. to form a first concentrate having a soluble solids content of from about 30% to about 80% by weight, adding to said concentrate an organic solvent selected from the group consisting of methyl alcohol, acetone, and a mixture of methyl alcohol and acetone to precipitate undesirable solids, separating said precipitated solids and recovering a second clear liquor, evaporating said second clear liquor to form a second concentrate having a soluble solids content of from about 40 to about 80% by weight, and thereafter drying said second concentrate to obtain said powdered ascorbic acid concentrate.

2. The concentrate of claim 1 wherein the concentrate contains at least 30% by weight of vitamin C.

References Cited in the file of this patent

Bandelin: J.A.P.A. (Sci. Ed.), vol. 44, No. 4, April 1955, pp. 241–244.

Charley: Recent Advances in Fruit Juice Production, 1950, Commonwealth Bureau of Horticulture and Plantation Corps., England, pp. 126, 130, 134 and 135.

Swisher: The Fruit Products Journal, vol. 14, August 1935, pp. 367–369.